US010263492B2

(12) United States Patent
Jang

(10) Patent No.: US 10,263,492 B2
(45) Date of Patent: Apr. 16, 2019

(54) WHEEL HAVING ELECTRICITY GENERATION-COMBINED ELECTROMECHANICAL MEANS HAVING PLURALITY OF AUXILIARY POWER STRUCTURES

(71) Applicant: Suk Ho Jang, Seoul (KR)

(72) Inventor: Suk Ho Jang, Seoul (KR)

( * ) Notice: Subject to any disclaimer, the term of this patent is extended or adjusted under 35 U.S.C. 154(b) by 344 days.

(21) Appl. No.: 15/102,772

(22) PCT Filed: Dec. 12, 2013

(86) PCT No.: PCT/KR2013/011539
§ 371 (c)(1),
(2) Date: Jun. 8, 2016

(87) PCT Pub. No.: WO2015/088076
PCT Pub. Date: Jun. 18, 2015

(65) Prior Publication Data
US 2016/0329775 A1 Nov. 10, 2016

(30) Foreign Application Priority Data

Dec. 10, 2013 (KR) .................. 10-2013-0152716

(51) Int. Cl.
*H02K 11/00* (2016.01)
*H02K 7/00* (2006.01)
(Continued)

(52) U.S. Cl.
CPC ............... *H02K 7/006* (2013.01); *B60B 7/00* (2013.01); *B60B 19/00* (2013.01); *B60K 7/0007* (2013.01);
(Continued)

(58) Field of Classification Search
CPC .......... H02K 7/06; H02K 7/14; H02K 1/2793; B60B 19/00; B60B 7/00
(Continued)

(56) References Cited

U.S. PATENT DOCUMENTS 5,581,136 A * 12/1996 Li ........................... B62M 6/45
180/220
5,600,191 A * 2/1997 Yang ........................ H02K 7/10
180/65.51
(Continued)

FOREIGN PATENT DOCUMENTS

JP H10-178761 6/1998
JP 2008-044588 A 2/2008
(Continued)

*Primary Examiner* — Hanh N Nguyen
(74) *Attorney, Agent, or Firm* — Novick, Kim & Lee, PLLC; Jae Youn Kim

(57) ABSTRACT

The present invention relates to a wheel including a means for power generation and transfer having a plurality of auxiliary power units in which compartments are formed inside one wheel, and a plurality of auxiliary power units capable of generating auxiliary power separately from a main power source are installed in the compartments, such that it is possible to secure increased driving force and rotational force while minimizing costs required for securing compartments required to facilitate a separate auxiliary power source, as well as decrease a used power due to driving an apparatus using the auxiliary power, and by reasonably solving the problems entailed in the wheel including a means for power generation and transfer, efficiency thereof is significantly improved.

5 Claims, 6 Drawing Sheets

(51) Int. Cl.
  *H02K 7/116* (2006.01)
  *H02K 7/14* (2006.01)
  *B60B 7/00* (2006.01)
  *B60B 19/00* (2006.01)
  *F16H 3/66* (2006.01)
  *H02K 1/27* (2006.01)
  *B60K 7/00* (2006.01)

(52) U.S. Cl.
  CPC ............. *F16H 3/66* (2013.01); *H02K 1/2793* (2013.01); *H02K 7/116* (2013.01); *H02K 7/14* (2013.01); *B60B 2900/351* (2013.01); *B60K 2007/0038* (2013.01); *B60K 2007/0092* (2013.01)

(58) Field of Classification Search
  USPC ................................ 310/67 R, 112, 113, 114
  See application file for complete search history.

(56) References Cited

U.S. PATENT DOCUMENTS

| | | | | |
|---|---|---|---|---|
| 5,763,980 | A | * | 6/1998 | Li ............................ B62M 6/45 310/323.03 |
| 6,011,337 | A | * | 1/2000 | Lin ...................... H02K 1/2793 310/103 |
| 9,884,595 | B2 | * | 2/2018 | Strothmann ............ B60R 16/02 |
| 2012/0032544 | A1 | * | 2/2012 | Kasuya .................... B60K 1/00 310/90 |

FOREIGN PATENT DOCUMENTS

| | | |
|---|---|---|
| KR | 10-2009-0052679 A | 5/2009 |
| KR | 10-1025387 B1 | 3/2011 |
| KR | 10-2011-0064759 A | 6/2011 |
| KR | 10-1117044 B1 | 3/2012 |

* cited by examiner

WHEEL HAVING ELECTRICITY GENERATION-COMBINED ELECTROMECHANICAL MEANS HAVING PLURALITY OF AUXILIARY POWER STRUCTURES

TECHNICAL FIELD

The present invention relates to a wheel including a means for power generation and transfer, and more particularly, to a wheel including a means for power generation and transfer having a plurality of auxiliary power units which rotate by attraction and repulsion due to signs of electric charges and polarities between a coil body and a magnet body, and is capable of improving a driving force (torque) and a rotational force, and being very efficiently used in various equipment due to having the plurality of auxiliary power units inside the wheel.

BACKGROUND ART

In general, an electric motor is an apparatus which convents an electrical energy into a mechanical energy using a force applied to a conductor flowing a current in a magnetic field, and is typically referred to as a motor. The motor is classified into a direct current (DC) motor and an alternating current (AC) motor according to types of power source, and the AC motor is again classified into a three-phase AC motor and a single-phase AC motor. Currently, the three-phase AC motor is mainly used.

The motor began to be made since around the time that Faraday discovered electromagnetic induction in 1831. The initial method of operating the motor is that a moving part was oscillated without rotating the same using the attraction and repulsion of permanent magnets. In the 1830s, a DC motor like today's type was first made using an armature and DC excited electromagnets, but the output was small and it was only developed in the research phase.

Thereafter, with Ferraris and Tesla's discovery of a rotating magnetic field being generated in an alternating current, they independently invented a two-phase AC motor. Since Dobrowolski from Germany first made a three-phase AC motor having an output of 100 watts (W), the three-phase AC motor has been mainly used as today's AC motor.

Both of the DC motor and AC motor are operated on the same principle. When placing a conductor flowing a current in the magnetic field, an electromagnetic force (Lorentz force) is generated in a direction perpendicular to the direction of the magnetic field. When placing the magnet inside the motor, a magnetic field is generated, and if the current flows in a conducting wire connected to a shaft, an electromagnetic force is generated. Accordingly, the shaft rotates to generate power according to the Fleming's left-hand rule. The electromagnetic force acting on the conducting wire is proportional to an intensity of the magnetic field, an intensity of the current and a length of the conducting wire.

The most typical motor based on the above-described principle has a universal and basic configuration in which a rotor including the permanent magnet or electromagnet is installed inside a stator including the permanent magnet or electromagnet. In particular, in a case of a DC motor having four contacts, the rotor including the electromagnet receives the power through the contacts to generate a continuous rotating motion through the attraction and repulsion by electromagnetism.

Generally, since when increasing a speed of the electric motor, a driving force is reduced, it is necessary for the electric motor to further include a reduction gear in order to obtain a desired driving force. However, if adding the reduction gear to the motor, the speed thereof is reduced. For an automobile, the above-described problem is solved by using a power of 300 volts or more, but the efficiency of the motor is significantly degraded due to rapid battery drainage, and an increase in a weight and costs of the vehicle.

Meanwhile, Korean Patent Registration Nos 10-1025387 and 10-1117044, which are filed by and issued to the present applicant, disclose a high-efficiency disc rotating apparatus for power generation and transfer, and Korean Patent Laid-Open Publication No. 10-2011-0064759 discloses a wheel having a means for power generation and transfer. These patents solve the problems entailed in the conventional electric motors by utilization of a special environment.

However, in the above-described electric motors, a predetermined driving force and a predetermined rotational force due to a turn ratio of a coil are always generated. Even when applying the above-described electric motor, in order to provide an increased driving force, a separate auxiliary power unit should be added thereto, and it is necessary to secure an installation space, which results in a large increase in costs. In addition, when increasing the driving force by adding the reduction gear, there is a limit to obtain the driving force by one driving apparatus.

Further, excessive power for driving the auxiliary power should be used, and thereby, the efficiency thereof is significantly degraded due to the consumption of a lot of power.

DISCLOSURE

Technical Problem

In consideration of the above-mentioned circumstances, it is an object of the present invention to provide a wheel including a means for power generation and transfer having a plurality of auxiliary power units in which compartments are formed inside one wheel, and a plurality of means capable of generating auxiliary power are installed in the compartments separately from a main power source, such that it is possible to secure increased driving force and rotational force while minimizing costs required for securing compartments required to facilitate a separate auxiliary power source, as well as decrease a used power due to driving an apparatus using the auxiliary power, and by reasonably solving the problems entailed in the wheel including a means for power generation and transfer, efficiency thereof is significantly improved.

Technical Solution

In order to accomplish the above objects, there is provided a wheel including a means for power generation and transfer having a plurality of auxiliary power units including:

a rotating ring which is mounted on an inner circumference of a rim of a wheel, and includes a first magnet body having a plurality of magnets arranged in compartments formed inside thereof at a constant interval;

a fixed plate which is fixed to a shaft, and includes a coil body having a plurality of coils arranged in the compartments corresponding to the magnets of the first magnet body;

first and second auxiliary power units which are installed in the compartments so as to provide an increased driving force by reducing the rotational force of the wheel; and wheel covers which are rotatably mounted on the shaft through bearings at both open sides of the rim, and configured to transfer the driving force generated from the first and second auxiliary power units to the wheel.

Advantageous Effects

According to the wheel including a means for power generation and transfer having a plurality of auxiliary power units of the present invention, it is possible to obtain auxiliary power due to a reduction by the first and second auxiliary power units installed inside of the rotating ring fixed to the rim, add an additional power in the wheel itself and increase a power strength due to the same, as well as, since there is no need to secure a separate auxiliary power, it is possible to simply configure an apparatus requiring electric power, and significantly reduce the costs due to decreasing the size of the apparatus, and in particular, an adequate driving force and rotational force may be obtained due to a multi-stage power transfer, and the efficiency thereof may be significantly improved.

BEST MODE

Terms or words used in the specification and claims should not be construed as limited to a conventional or lexical meaning, and should be understood as appropriate notions by the inventor based on that he/she is able to define terms to describe his/her invention in the best way to be seen by others.

Therefore, embodiments and drawings described herein are the most preferable embodiment of the present invention and not exhaustive in terms of the technical idea of the present invention, and it will be understood that various modifications and equivalents may be made to take the place of the embodiments at the application point of the present invention.

Hereinafter, preferable embodiments of the present invention will be described with reference to the accompanying drawings.

Figure 1:
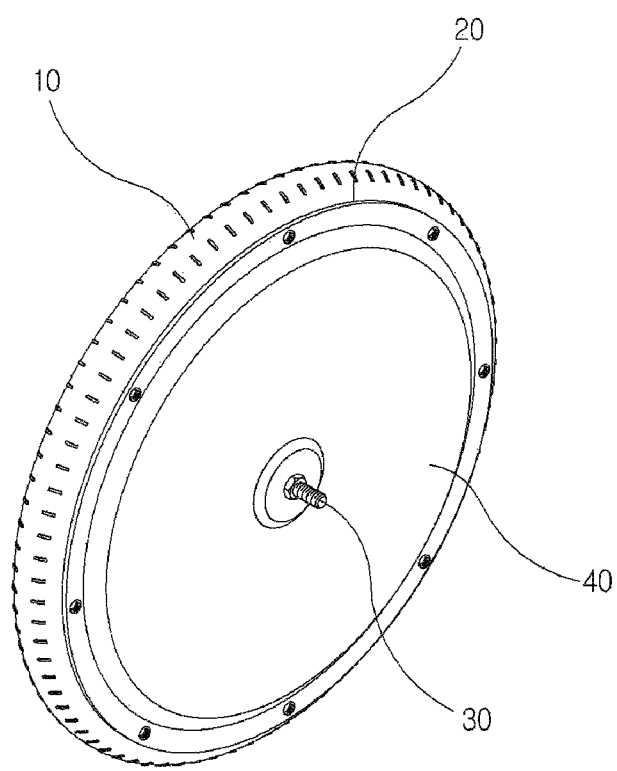
FIG. 1 is a perspective view illustrating a wheel including a means for power generation and transfer having a plurality of auxiliary power units according to the present invention.
Figure 2:
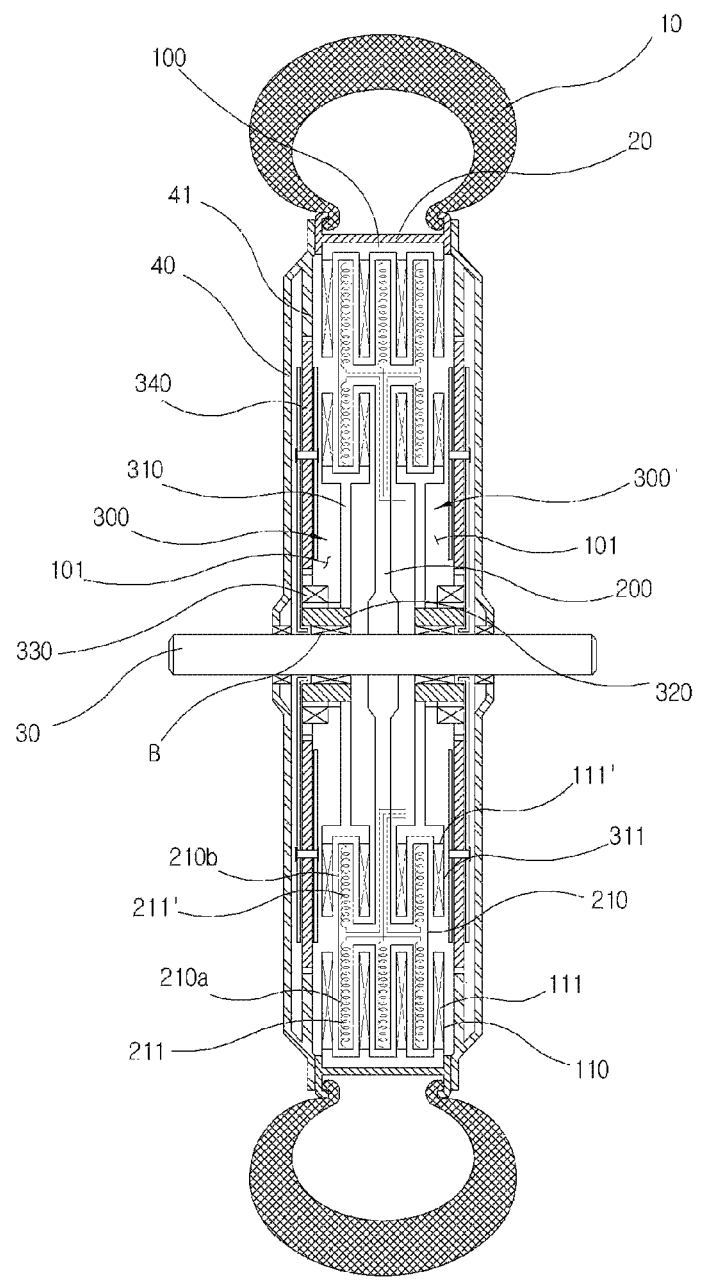
FIG. 2 is a cross-sectional view illustrating a wheel including a means for power generation and transfer having a plurality of auxiliary power units according to a first embodiment of the present invention.
Figure 3:
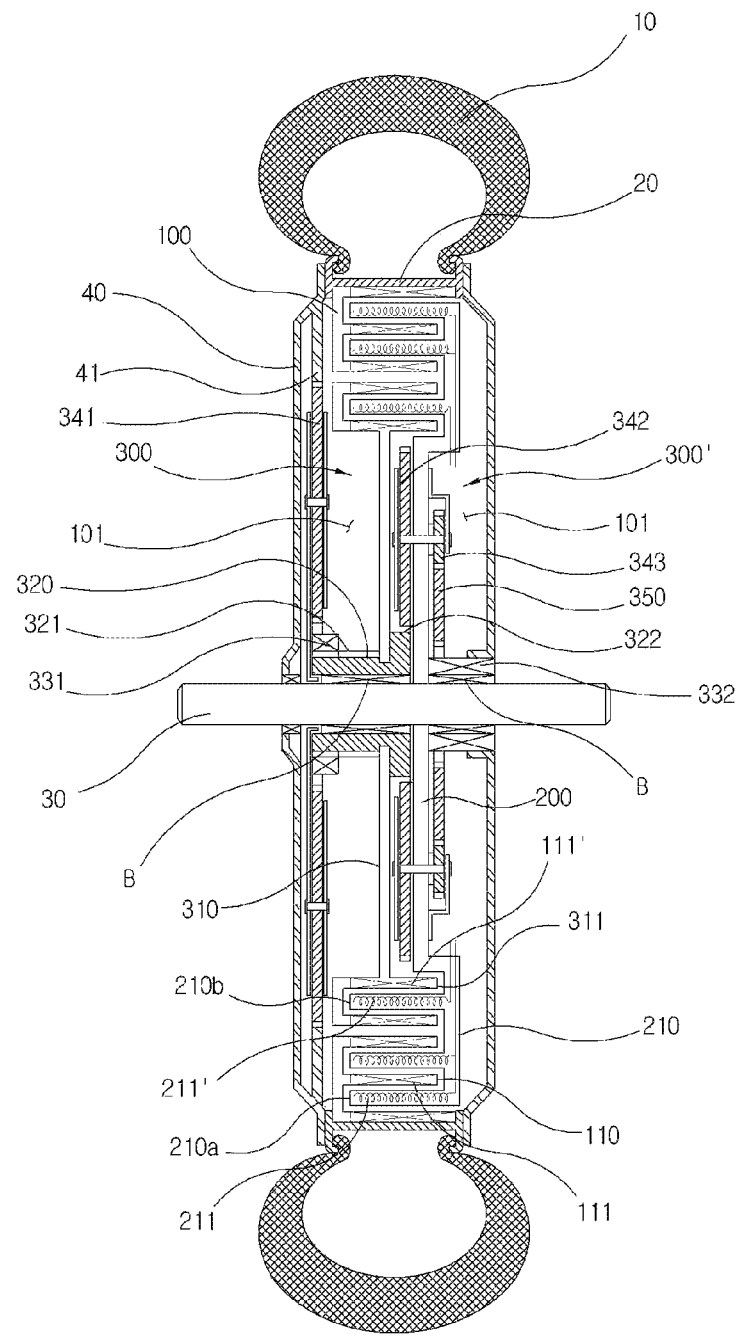
FIG. 3 is a cross-sectional view illustrating a wheel including a means for power generation and transfer having a plurality of auxiliary power units according to a second embodiment of the present invention.

FIG. 1 is a perspective view illustrating a wheel including a means for power generation and transfer having a plurality of auxiliary power units according to the present invention, FIG. 2 is a cross-sectional view illustrating a wheel including a means for power generation and transfer having a plurality of auxiliary power units according to a first embodiment of the present invention, and FIG. 3 is a cross-sectional view illustrating a wheel including a means for power generation and transfer having a plurality of auxiliary power units according to a second embodiment of the present invention.

As illustrated in FIGS. 1 to 3, a wheel 10 including a means for power generation and transfer having a plurality of auxiliary power units according to the present invention includes a rotating ring 100, a fixed plate 200, first and second auxiliary power units 300 and 300' and wheel covers 40.

Herein, the wheel is not particularly limited so long as it has a structure in which a typical tire 10 is coupled on an outer circumference of a rim 20 having a space therein.

The rotating ring 100 is mounted on an inner circumference of the rim 20, has compartments 101 formed in an annular shape as a hole, and includes a first magnet body 110 disposed on an inner circumference of thereof.

Herein, the first magnet body 110 is formed in a ring shape, and the first magnet body 110 includes a plurality of magnets 111 arranged in a constant interval.

The fixed plate 200 is formed in a disc shape, and is fixed to a shaft 30 of an apparatus (not illustrated in the drawings), which is horizontally disposed in a center of the compartments 101 and has electric power. The fixed plate includes a coil body 210 configured so as to correspond to the first magnet body 110, and the coil body has a plurality of coils 211 and 211' disposed corresponding to the plurality of magnets 111 and 111' of the first magnet body 110 and the second magnet body 311, respectively.

The first and second auxiliary power units 300 and 300' are installed in compartments 101 on both sides of the fixed plate 200 to play a role of increasing driving force and rotational force (angular velocity) of the wheel 10.

The wheel covers 40 are rotatably mounted on the shaft through bearings with covering both sides of the rim 20, and are configured to transfer the rotational force of the first and second auxiliary power units 300 and 300' to the wheel 10.

Meanwhile, the wheel 10 having the above-described configuration may be implemented in various types in order to increase the driving force and rotational force (angular velocity), which will be described in detail below through embodiments.

The first embodiment of the present invention will be described with reference to FIG. 2.

First, the magnets of the first magnet body 110 of the rotating ring 100 are arranged in a plurality of rows at a constant interval. The arrangement method is not particularly limited, and a plurality of magnets are disposed on the inner circumference of the rotating ring 100 so as to vertically extend toward the center of the rotating ring 100, and are arranged in four rows or three rows at a constant interval in the embodiment of the present invention.

In addition, the coil body 210 of the fixed plate 200 includes an outer coil body 210a arranged to face a circumferential direction of the fixed plate 200, and an inner coil body 210b arranged to face a center of the fixed plate 200.

Herein, the outer coil body 210a is formed on an outer circumference of the fixed plate 200, and faces the circumferential direction so as to be housed between the magnets of the first magnet body 110. The coils of the outer coil body are disposed in three rows between the magnets of the first magnet body 110.

That is, as described above, the magnets of the first magnet body 110 and the coils of the outer coil body 210a are alternately arranged with each other in a horizontal direction.

In addition, the coils of the inner coil body 210b are arranged toward the center of the fixed plate 200 from the outer coil body 210a at an inner side of the outer coil body in a plurality of rows, for example, three rows at a constant interval, and extend in a symmetrical arrangement with the coils of the outer coil body 210a in a vertical direction.

In addition, the wheel including a means for power generation and transfer further includes the first and second auxiliary power units 300 and 300' installed in both compartments 101 about the fixed plate 200 in a bilaterally symmetrical arrangement.

In this case, each of the first and second auxiliary power units 300 and 300' is configured as follows.

The auxiliary power unit includes a disc 310 formed in a disc shape. The central portions of the disc 310 is connected to a driving gear 320 which is rotatably mounted on the shaft 30 through a one-way bearing B, thereby the disc may rotate on the shaft with the driving gear.

In addition, a second magnet body 311 has magnets disposed at the outer edge portion of the disc 310, the magnets of the second magnet body 311 extend in two rows in the circumferential direction so as to house the coil of the inner coil body 210b.

Further, clutch gears 330 disposed on one side of driving gears 320 transfer the rotational force in only one direction as the conventional one-way clutch, and are maintained in a contact state with the driving gears 320 under a rotational force having a constant magnitude. That is, if the rotational force is provided to the discs 310, and when the rotational force having a constant magnitude is applied thereto, the clutch gears 330 are in contact with the driving gears 320 to rotate together therewith, and when the rotational force having a constant magnitude or more is applied thereto or during a reverse rotation, the clutch gears are configured to idle due to being separated from each other.

Further, internal gears 41 are formed on the inner circumference of the wheel covers 40, and the clutch gears 330 and the internal gears 41 are configured to be meshed with each other by one or more planetary gears 340 providing a deceleration force so as to operate in connection with each other.

Next, a second embodiment of the present invention will be described with reference to FIG. 3.

First, the magnets of the first magnet body 110 of the rotating ring 100 are arranged in a plurality of columns at a constant interval. The arrangement method thereof is not particularly limited, and a plurality of magnets 111 horizontally extend on the inner circumference of the rotating ring 100 toward one wheel cover 40, and are arranged in three columns at a constant interval.

In addition, the fixed plate 200 is installed on the shaft by shifting from a center to one side of the wheel 10. The coil body 210 of the fixed plate 200 includes an outer coil body 210a formed at an outer edge portion of the fixed plate 200, and an inner coil body 210b arranged toward the center of the fixed plate 200 from the outer coil body 210a.

Herein, the plurality of coils of the outer coil body 210a horizontally extend so as to be housed between the magnets of the first magnet body 110 at an outer edge portion of the fixed plate 200, and are arranged in three columns so as to be housed between two columns of the first magnet body 110, respectively.

That is, as described above, the magnets of the first magnet body 110 and the coils of the outer coil body 210a are alternately arranged with each other.

In addition, the coil of the inner coil body 210b is arranged at a position separated from the outer coil body 210a toward the center of the fixed plate 200 in one column, and horizontally extend.

In addition, the wheel including a means for power generation and transfer further includes the first and second auxiliary power units 300 and 300' installed in both compartments about the fixed plate 200.

In this case, the first auxiliary power unit is configured as follows.

First, the first auxiliary power unit includes a disc 310 formed in a disc shape at one side of the fixed plate 200. Herein, driving gears 320 include a first driving gear 321 extend to one wheel cover 40 side, and a second driving gear 322 having a larger gear ratio than the first driving gear 321. The disc may freely rotate on the shaft through a one-way bearing B.

In addition, a second magnet body 311 is disposed at the outer edge portion of the disc 310 and has a plurality of magnets 111' which house the inner coil body 210b of the fixed plate 200 and are arranged corresponding to the coils 211'. The magnets of the second magnet body 311 horizontally extend in two columns to the one wheel cover 40 side in a constant interval so as to house the coil of the inner coil body 210b.

Herein, the first auxiliary power unit 300 is operated as follows.

A first clutch gear 331 which is in contact with or separated from the first driving gear 321 of the driving gear 320 transfers the rotational force in only one direction as the conventional one-way clutch, and is maintained in a contact state with the first driving gear 321 under a rotational force having a constant magnitude. That is, if the rotational force is provided to the disc 310, and when the rotational force having a constant magnitude is applied thereto, the first clutch gear 331 is in contact with the first driving gear 321 to rotate together therewith, and when the rotational force having a constant magnitude or more is applied thereto or during a reverse rotation, are configured to idle due to being separated from each other.

The internal gear 41 is formed on the inner circumference of the wheel cover 40, and the first clutch gear 331 and the internal gear 41 are configured to be meshed with each other by one or more planetary gears 341 providing a deceleration force so as to operate in connection with each other.

The second auxiliary power unit 300' is configured as follows.

A second driving gear 322 of the driving gear 320 is meshed with one or more second planetary gears 342 installed on the one side of the fixed plate 200. Third planetary gears 343 are installed on the other side of the fixed plate 200 by axes on the same axial lines as the respective second planetary gears 342.

A second clutch gear 332 is mounted on the shaft 30 through a one-way bearing B so as to rotate in one direction, and is installed to the other wheel cover 40 on the shaft 30.

A linkage gear 350 is arranged on the second clutch gear 332 to be meshed with the third planetary gears 343. By the linkage gear 350, the rotational force may be transferred from the second clutch gear 332 to the third planetary gears.

The second clutch gear 332 transfers the rotational force in only one direction as the conventional one-way clutch, and is maintained in a meshed state with the linkage gear 350 under a rotational force having a constant magnitude.

That is, if the rotational force is provided to the linkage gear 350, and when the rotational force having a constant magnitude is applied thereto, the second clutch gear is in contact with the linkage gear 350 to rotate together therewith, and when the rotational force having a constant magnitude or more is applied thereto or during a reverse rotation, is configured to idle due to being separated from each other.

Hereinafter, an operation of the wheel including a means for power generation and transfer having a plurality of auxiliary power units will be described in detail with reference to the accompanying drawings.

First, in the wheel including a means for power generation and transfer having a plurality of auxiliary power units according to the present invention, when a DC power is applied to the coil body 210 formed in the fixed plate 200, by an action of the attraction and repulsion due to signs of electric charges induced from the coil body 210 and polarities between the first magnet body 110 of the rotating ring 100 and the second magnet body 311 of the discs 310, the rotating ring 100 and the discs 310 are freely rotated about the shaft 30.

Herein, such the action is executed on the same principle as disclosed in Korean Patent Laid-Open Publication No. 10-2010-0012178 which is a prior patent filed by the present applicant. That is, when repeatedly switching the polarities of the DC power applied to the coil body 210, the signs of electric charges induced from the coil body 210 are also switched, and the polarities due to the first and second magnet bodies 110 and 311 interfere with the signs of the charges, such that it is possible to freely rotate while the attraction or repulsion is generated therebetween. In this state, the rotating ring 100 and the discs 310 rotate together.

Herein, in the present invention, the coils of the coil body 210 and the magnets of the first and second magnet bodies 110 and 311 are formed in a plurality of rows, such that the attraction and repulsion may be increased according to an increase in the number of the coils 211 and 211' arranged in the coil body 210 and the magnets 111 and 111' arranged in the first and second magnet bodies 110 and 311.

Meanwhile, in the present invention, a strong driving force is further provided to the wheel 10 substantially applied with a rolling rotational force, which may be achieved by the first and second auxiliary power units 300 and 300'.

First, an operational relation between the first and second auxiliary power units 300 and 300' according to the first embodiment of the present invention will be described.

Figure 4:
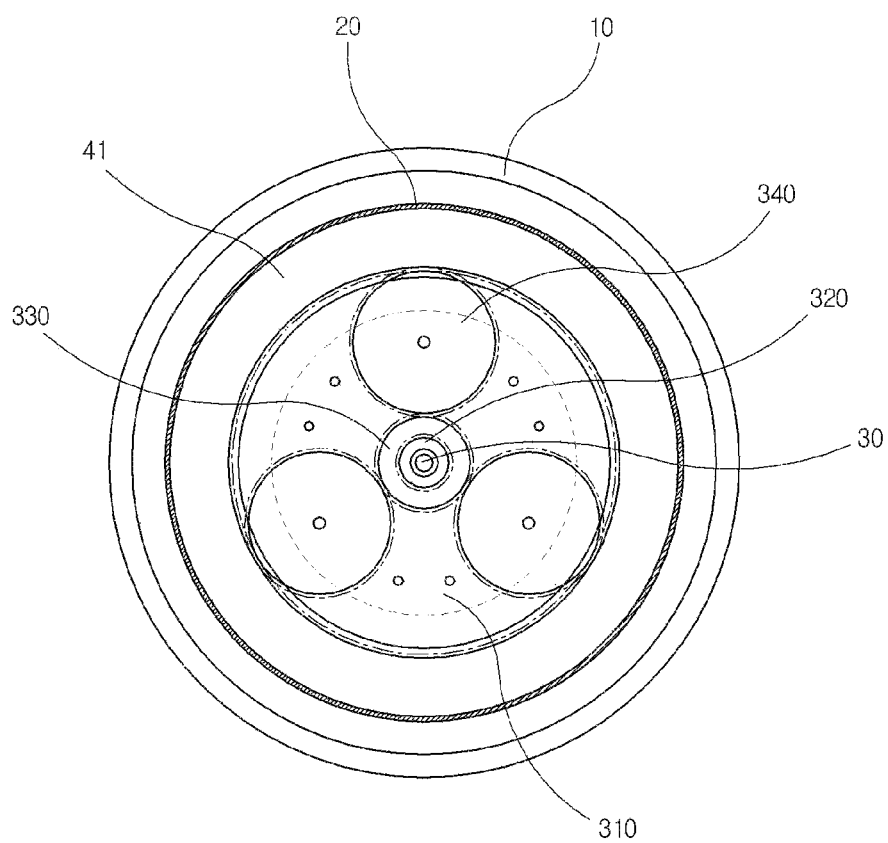
FIG. 4 is a schematic view illustrating an operation state of the wheel including a means for power generation and transfer having a plurality of auxiliary power units according to the first embodiment of the present invention.

Referring to FIG. 2, as illustrated in FIG. 4, when the DC power is first applied to the coil body 210 formed in the fixed plate 200, that is, to the outer coil body 210a and inner coil body 210b, a driving force of the rotating ring 100 corresponding to the wheel 10 is provided by the attraction and repulsion, and the driving force is provided to the discs 310, such that an increased driving force is transferred to the wheel 10 by adding the driving force of the discs 310 to the driving force of the rotating ring 100. As a result, the rotational force (angular velocity) of the wheel is gradually increased.

That is, in the first and second auxiliary power units 300 and 300', the discs 310 freely rotate about the shaft 30 coupled with one-way bearings B during rotating the discs 310, and thereby the rotational force is provided to the driving gears 320.

In this case, since the driving gears 320 are in contact with the clutch gears 330, the rotational force is transferred to the clutch gears 330, and the rotational force is transferred to the internal gears 41 of the wheel covers 40.

Meanwhile, as described above, when transferring the rotational force to the internal gears 41, the clutch gears 330 and the internal gears 41 are meshed with each other by the conventional planetary gears 340 which serve to reduce the speed. In the planetary gears 340, the rotational force transferred to the clutch gears 330 is reduced to be converted into a strong driving force, and then the increased driving force is transferred to the wheel 10 through the internal gears 41.

That is, by adding the driving force which is generated from the discs 310 and reduced to the driving force of the rotating ring 100, a further increased driving force is applied to the wheel 10, and thereby providing the strong driving force.

Meanwhile, as described above, when providing a rotational force having a constant magnitude or more to the wheel 10 which is provided with the strong rotational force, the rotational force due to the discs 310 is not transferred thereto any more. That is, the clutch gears 330 are in contact with the driving gears 320 under the rotational force having a constant magnitude or more as described above. In this case, if the rotational force exceeds the constant magnitude, the clutch gears 330 are separated from the driving gears 320, such that these gears idle. If the rotational force of the wheel 10 is decreased, the clutch gears 330 are again contact with the driving gears 320 to provide the driving force to the wheel 10.

In this regard, the first and second auxiliary power units 300 and 300' operated as described above are formed on both sides of the fixed plate 200 in a symmetrical shape with each other. Accordingly, by adding the strong driving force from the both auxiliary power units 300 and 300' to the wheel 10, it is possible to increase the driving force and the rotational force.

In addition, an operation relation of the first and second auxiliary power units 300 and 300' according to the second embodiment of the present invention will be described.

When the DC power is first applied to the coil body 210 formed in the fixed plate 200, that is, to the outer coil body 210a and inner coil body 210b, a driving force of the rotating ring 100 corresponding to the wheel 10 is provided by the attraction and repulsion, and the driving force is provided to the disc 310, such that an increased driving force is transferred to the wheel 10 by adding the driving force of the disc 310 to the driving force of the rotating ring 100. As a result, the rotational force of the wheel is gradually increased.

That is, in the first and second auxiliary power units 300 and 300', the disc 310 freely rotates about the shaft 30 coupled with one-way bearing B during rotating the disc 310, and thereby the rotational force is provided to the driving gear 320.

Herein, the first auxiliary power unit 300 is operated as follows.

Figure 5:
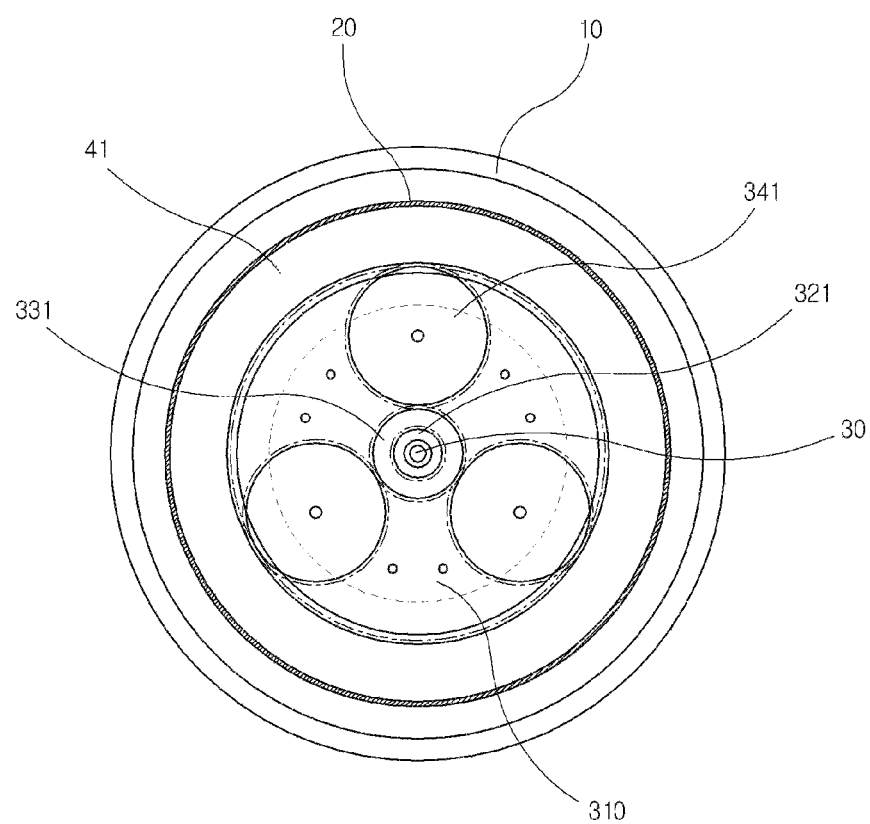
FIG. 5 is a schematic view illustrating an operation state of the wheel including a means for power generation and transfer having a plurality of auxiliary power units according to the second embodiment of the present invention.

Referring to FIG. 3, as illustrated in FIG. 5, since the first driving gear 321 is in contact with the first clutch gear 331, the rotational force is transferred to the first clutch gear 331, and the rotational force is transferred to the internal gear 41 of the wheel cover 40.

Meanwhile, as described above, when transferring the rotational force to the internal gear 41, the first clutch gear 331 and the internal gear 41 are meshed with each other by the conventional first planetary gears 341 which serve to reduce the speed. In the first planetary gears 341, the rotational force transferred to first clutch gear 331 is reduced to be converted into a strong driving force, and then the increased driving force is transferred to the internal gear 41.

That is, by adding the driving force which is generated from the disc 310 and reduced to the driving force of the rotating ring 100, a further increased driving force is applied to the wheel 10, and thereby providing the strong driving force.

Further, the second auxiliary power unit 300' is operated as follows.

Figure 6:
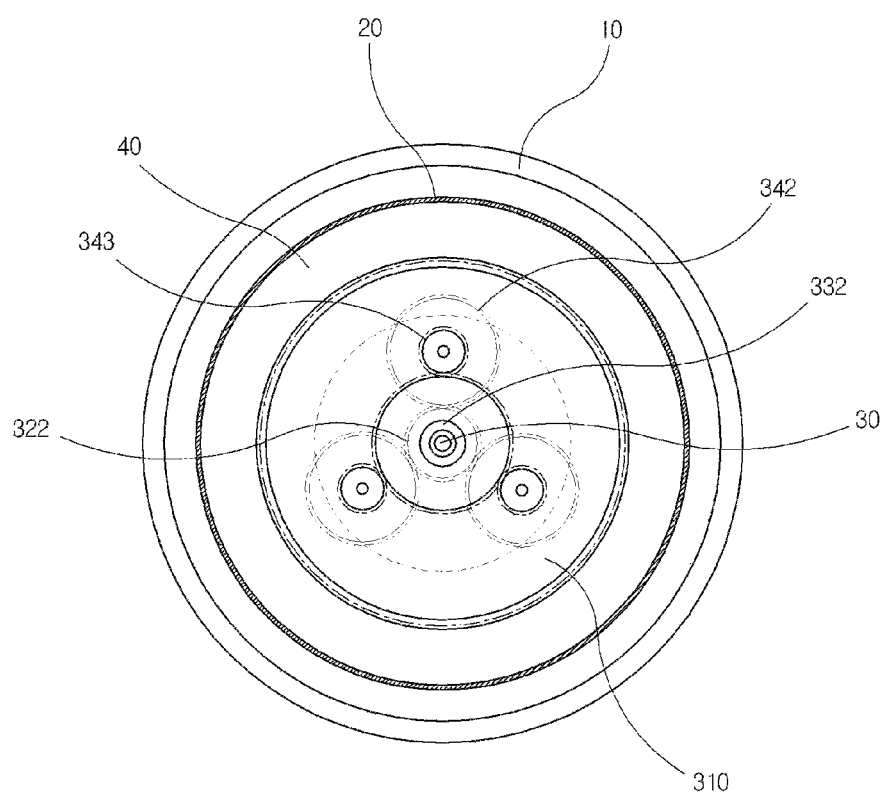
FIG. 6 is a schematic view illustrating a two-stage reduction operation state of the wheel including a means for power generation and transfer having a plurality of auxiliary power units according to the second embodiment of the present invention.

As illustrated in FIG. 6, the second driving gear 322 is meshed with the conventional second planetary gears 342 which serve to reduce the speed. In the second planetary gears 342, the rotational force transferred to second driving gear 322 is reduced.

In addition, since the third planetary gears 343 are installed on the other side of the fixed plate 200 on the same axial line as the second planetary gears 342, the rotational force is transferred to the third planetary gears 343.

Thereafter, the rotational force transferred to the third planetary gears 343 is transferred to the linkage gear 350, then is transferred to the second clutch gear 332 mounted on the shaft 30 through the one-way bearing B. Accordingly, the rotational force is provided to the wheel cover 40 through the second clutch gear 332 installed thereon.

That is, by adding the driving force which is generated from the disc 310 and reduced to the driving force of the rotating ring 100, a further increased driving force is applied to the wheel 10, and thereby providing the strong driving force.

Meanwhile, as described above, when providing a rotational force having a constant magnitude or more to the wheel 10 which is provided with the strong rotational force, the rotational force due to the disc 310 is not transferred thereto any more. That is, the first and second clutch gears 331 and 332 are meshed with the linkage gear 350 under the rotational force having a constant magnitude or more as described above. In this case, if the rotational force exceeds the constant magnitude, the first and second clutch gears 331 and 332 are separated from the first driving gear 321 or the linkage gear 350, such that these gears idle. If the rotational force of the wheel 10 is decreased, the first and second clutch gears 331 and 332 are again in contact with the first driving gear 321 or the linkage gear 350 to provide the driving force to the wheel 10.

As described above, since the wheel including a means for power generation and transfer having a plurality of auxiliary power units according to the present invention has the compartments formed inside the rotating ring, and the first and second auxiliary power units are installed in the compartments, a strong driving force is generated in the wheel itself which is reduced by the first and second auxiliary power units, and thereby automatically transmitted when an increased driving force is required during initial operating or driving on an uphill road.

DESCRIPTION OF REFERENCE NUMERALS

10: wheel,
20: rim
30: shaft,
40: wheel cover
41: internal gear
100: rotating ring,
101: compartment
110: first magnet body,
111, 111': magnet
200: fixed plate,
210: coil body
211, 211': coil,
210a: outer coil body
210b: inner coil body
300, 300': first and second auxiliary power unit,
310: disc
311: second magnet body,
320: driving gear
321: first driving gear,
322: second driving gear
330: clutch gear,
331: first clutch gear
332: second clutch gear 332,
340: planetary gear
341: first planetary gear,
342: second planetary gear
343: third planetary gear,
350: linkage gear

The invention claimed is:

1. A wheel including a plurality of auxiliary power units, the wheel comprising:
   a rotating ring which is mounted on an inner circumference of a rim of the wheel, and includes a first magnet body having a plurality of magnets arranged at a constant interval in compartments formed inside the rotating ring;
   a fixed plate which is fixed to a shaft, and includes a coil body having a plurality of coils arranged in the compartments corresponding to the magnets of the first magnet body;
   first and second auxiliary power units which are installed in the compartments so as to provide an driving force to the wheel; and
   wheel covers which are rotatably mounted on the shaft through bearings at both open sides of the rim, and configured to transfer the driving force generated from the first and second auxiliary power units to the wheel.

2. The wheel according to claim 1, wherein the magnets of the first magnet body of the rotating ring are arranged in a plurality of rows toward a center of the rotating ring at a constant interval,
   the coil body of the fixed plate includes an outer coil body having a plurality of coils housed between the magnets of the first magnet body at an outer edge portion of the fixed plate, and an inner coil body having a plurality of coils arranged toward a center of the fixed plate so as to be symmetrical with the coils of the outer coil body in a vertical direction, and
   the first and second auxiliary power units are installed adjacent to the fixed plate in a bilaterally symmetrical arrangement.

3. The wheel according to claim 2, wherein each of the first and second auxiliary power units comprises:
   a driving gear mounted on the shaft through one-way bearings, and a disc which houses the inner coil body of the fixed plate, includes a second magnet body having a plurality of magnets arranged corresponding to the coils of the inner coil body, and is connected to the driving gear;
   a clutch gear arranged on the driving gears apart from the disc so as to rotate in one direction, and is configured to be in contact with or separated from the driving gear; and
   one or more planetary gears configured to be meshed with the clutch gear and an internal gear formed on an inner circumference of the wheel cover to operate in connection with each other.

4. The wheel according to claim 1, wherein the magnets of the first magnet body of the rotating ring are arranged in a plurality of columns at a constant interval and horizontally extend toward the wheel covers, the fixed plate is installed on the shaft by shifting from a center to one side thereof, the coil body of the fixed plate includes an outer coil body having a plurality of coils housed between the magnets of the first magnet body at an outer edge portion of the fixed plate, and an inner coil body having a coil arranged toward a center of the fixed plate from the outer coil body, and the first and second auxiliary power units are installed adjacent to the fixed plate.

5. The wheel according to claim 1, wherein the first auxiliary power unit comprises:

a driving gear including a first driving gear which is mounted on the shaft through a bearing on one side of the fixed plate, and extends to one of the wheel covers, and a second driving gear having a larger gear ratio than the first driving gear; and a disc which houses an inner coil body of the fixed plate, includes a second magnet body having magnets arranged corresponding to the coils of the inner coil body, and is connected to the driving gear;

a first clutch gear arranged on the first driving gear apart from the disc so as to rotate in one direction, and is configured to be in contact with or separated from the first driving gear; and one or more first planetary gears configured to mesh with the first clutch gear and an internal gear formed on an inner circumference of one of the wheel covers to operate in connection with each other, and the second auxiliary power unit comprises:

the second driving gear, and one or more second planetary gears installed on one side of the fixed plate by axes to be meshed with the second driving gear;

one or more third planetary gears installed on another side of the fixed plate by axes on the same axial lines as the respective second planetary gears;

a second clutch gear installed to the other wheel cover and mounted on the shaft through a one-way bearing so as to rotate in one direction, and is configured to be in contact with or separated from the second driving gear; and a linkage gear arranged on the second clutch gear to be meshed with the third planetary gears, wherein the second clutch gear is configured so as to be meshed with the linkage gear within a predetermined range of the number of revolutions of the linkage gear.

\* \* \* \* \*